United States Patent
Borntrager et al.

(10) Patent No.: US 9,377,094 B2
(45) Date of Patent: Jun. 28, 2016

(54) STARTER AND RETARDER ELEMENT, AND METHOD FOR OPERATING A STARTER AND RETARDER ELEMENT

(71) Applicant: ZF Friedrichshafen AG, Friedrichshafen (DE)

(72) Inventors: Kai Borntrager, Langenargen (DE); Johannes Kaltenbach, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 12 days.

(21) Appl. No.: 14/390,082

(22) PCT Filed: Mar. 4, 2013

(86) PCT No.: PCT/EP2013/054234
§ 371 (c)(1),
(2) Date: Oct. 2, 2014

(87) PCT Pub. No.: WO2013/152893
PCT Pub. Date: Oct. 17, 2013

(65) Prior Publication Data
US 2015/0053522 A1 Feb. 26, 2015

(30) Foreign Application Priority Data
Apr. 11, 2012 (DE) .......... 10 2012 205 825

(51) Int. Cl.
*F16H 47/08* (2006.01)
*B60T 10/02* (2006.01)
(Continued)

(52) U.S. Cl.
CPC ............... *F16H 47/08* (2013.01); *B60T 1/062* (2013.01); *B60T 1/087* (2013.01); *B60T 10/02* (2013.01); *F16D 57/04* (2013.01); *F16H 3/006* (2013.01)

(58) Field of Classification Search
None
See application file for complete search history.

(56) References Cited

U.S. PATENT DOCUMENTS 4,050,556 A * 9/1977 Forster .................... B60T 1/087
  192/216
4,117,745 A 10/1978 Yokoyama et al.
(Continued)

FOREIGN PATENT DOCUMENTS

DE 31 44 902 A1 5/1983
DE 41 22 628 A1 1/1993
(Continued)

OTHER PUBLICATIONS

German Search Report Corresponding to 10 2012 205 823.0 mailed Mar. 12, 2014.
(Continued)

*Primary Examiner* — Mark Manley
(74) *Attorney, Agent, or Firm* — Davis & Bujold PLLC; Michael J. Bujold

(57) ABSTRACT

A start-up and retarder element having a hydrodynamic transfer element (5, 5') and a planetary gear set (4). The hydrodynamic transfer element (5, 5') has at least one first functional wheel (11, 11') and one second functional wheel (12, 12'). The first functional wheel (11, 11') can be fixed on a stationary component (14) by a single shift element (15). A start-up function or a driving function can be set in which the functional wheels (11, 11'; 12, 12') of the hydrodynamic transfer element (5, 5') function as an impeller and a turbine, respectively, of a hydrodynamic start-up element so that a retarder function can be set, or the functional wheels (11, 11'; 12, 12') of the hydrodynamic transfer element (5, 5') function as a rotor and a stator, respectively, of a hydrodynamic retarder.

11 Claims, 8 Drawing Sheets

(51) Int. Cl.
   *B60T 1/06* (2006.01)
   *F16D 57/04* (2006.01)
   *F16H 3/00* (2006.01)
   *B60T 1/087* (2006.01)

(56) References Cited

U.S. PATENT DOCUMENTS

| | | | |
|---|---|---|---|
| 4,430,908 A * | 2/1984 | Stockton | F16H 47/085 475/205 |
| 4,699,022 A | 10/1987 | Stadt et al. | |
| 5,700,219 A | 12/1997 | Ohkubo | |
| 5,954,607 A | 9/1999 | Nitsche et al. | |
| 6,159,123 A | 12/2000 | Gumpoltsberger | |
| 7,361,111 B2 | 4/2008 | Aitzetmueller et al. | |
| 7,762,917 B2 | 7/2010 | Maucher et al. | |
| 2006/0225527 A1 | 10/2006 | Yang et al. | |
| 2010/0078281 A1 | 4/2010 | Kajigai et al. | |
| 2010/0173746 A1 | 7/2010 | Ideshio et al. | |
| 2013/0288850 A1 | 10/2013 | Kaltenbach | |

FOREIGN PATENT DOCUMENTS

| | | |
|---|---|---|
| DE | 196 29 496 A1 | 1/1997 |
| DE | 198 09 467 A1 | 9/1999 |
| DE | 198 17 865 A1 | 10/1999 |
| DE | 100 45 337 A1 | 3/2002 |
| DE | 10 2004 059 733 A1 | 6/2006 |
| DE | 20 2005 021 249 U1 | 8/2007 |
| DE | 10 2008 044 102 A1 | 6/2010 |
| DE | 10 2010 030 569 A1 | 12/2011 |
| DE | 10 2010 061 827 A1 | 5/2012 |
| DE | 10 2011 089 467 A1 | 6/2013 |
| EP | 0 879 370 B1 | 11/1998 |
| EP | 2 025 550 A2 | 2/2009 |
| WO | 2007/124711 A1 | 11/2007 |
| WO | 2009/039629 A1 | 4/2009 |
| WO | 2013/091971 A1 | 6/2013 |

OTHER PUBLICATIONS

German Search Report Corresponding to 10 2012 205 825.7 mailed Oct. 23, 2012.

International Search Report Corresponding to PCT/EP2013/054232 mailed Jul. 23, 2013.

International Search Report Corresponding to PCT/EP2013/054234 mailed Apr. 29, 2013.

Written Opinion Corresponding to PCT/EP2013/054234 mailed Apr. 29, 2013.

* cited by examiner

STARTER AND RETARDER ELEMENT, AND METHOD FOR OPERATING A STARTER AND RETARDER ELEMENT

This application is a National Stage completion of PCT/EP2013/054234 filed Mar. 4, 2013, which claims priority from German patent application serial no. 10 2012 205 825.7 filed Apr. 11, 2012.

FIELD OF THE INVENTION

The invention relates to a start-up and retarder element,

BACKGROUND OF THE INVENTION

Commercial vehicle transmissions, for example, automatic power-shift transmissions for city busses, are often equipped with a hydrodynamic torque converter as the start-up element for reasons related to comfort and wear, and are often equipped with an additional wear-free constant-braking device, such as a hydrodynamic retarder, because of the thermal load on the service brakes resulting from a plurality of start-up and braking procedures occurring in close succession or resulting from downhill travel with a high overall weight. This results in additional costs and complexity, however, due to components, weight, and construction space. Conventional hydrodynamic retarders also generate braking torque in the deactivated state, which is additional drag torque and increases the overall drag torque of the vehicle transmission and therefore unfavorably affects fuel consumption and the efficiency of the drive.

In hydrodynamic retarders, the mechanical energy of a drive shaft is converted into the kinetic energy of a hydraulic fluid, for example, oil. The physical operating principle corresponds to that of a hydrodynamic clutch, which comprises an impeller driven by an engine, as the drive, and a turbine as the output, wherein the turbine is fixed. A conventional hydrodynamic retarder therefore comprises a rotor blade wheel located in the power flow and a stator blade wheel, which is fixedly connected to a retarder housing. When the retarder is actuated, a quantity of fluid corresponding to the desired braking power is introduced into a retarder chamber. The flow stream is regulated by means of an electric proportional valve, for example, the proportional magnet of which is energized accordingly. In the retarder chamber, the rotating rotor propels the hydraulic fluid, which is supported against the stator blades, whereby kinetic energy of flow is converted into heat and a braking effect is thereby generated on the rotor and the driving shaft thereof, thereby braking the entire vehicle.

Start-up and retarder elements that combine the functions of a hydrodynamic start-up element, such as a fluid coupling or a torque converter, and a hydrodynamic retarder in one unit are already known.

Such a system, which is known from DE 100 45 337 A1, comprises a hydrodynamic clutch having an impeller and a turbine, wherein the impeller is connected to a drive motor, and a friction clutch is engaged in parallel for the purpose of lock-up. In addition, the turbine is connected to a transmission input of a downstream manual transmission by means of a freewheel and can be fixed on a housing by means of a turbine brake. At start-up, the drive power is transferred to the transmission input by means of the hydrodynamic circuit. In order to implement braking, the turbine is fixedly braked against the housing and the friction clutch is engaged. Filling the hydrodynamic clutch with hydraulic fluid permits the hydrodynamic clutch to function as a primary retarder.

EP 0 879 370 B1 discloses a transmission unit comprising a hydraulic transmission part, which has a primary blade wheel and a secondary blade wheel, which together form a working chamber, which can be filled with hydraulic fluid, and comprising a mechanical transmission part disposed downstream thereof. The mechanical transmission part can be, for example, a planetary transmission having one or more coupled planetary gear sets, with forward gear steps and reverse gear steps. The hydraulic transmission part can be operated in two operating states, namely in a first driving state as a hydrodynamic clutch and in a second braking state as a hydrodynamic retarder.

In the driving state, for example in a start-up procedure, power is transferred from a primary blade wheel to the mechanical transmission part via a secondary blade wheel. In this case, the primary blade wheel functions as an impeller and the secondary blade wheel functions as a turbine. In the braking state, one of the two blade wheels is fixed and the other of the two blade wheels is connected to the mechanical transmission part. In this case, the primary blade wheel functions as a stator blade wheel and the secondary blade wheel functions as a rotor blade wheel, which rotates in the reverse direction due to the opposite direction of flow. A plurality of power-shift elements embodied as clutches or brakes is provided for the two operating states, each of which can act on the blade wheels, optionally together with further shift elements of the mechanical transmission part, and can couple one blade wheel or both blade wheels to the transmission, or can bypass or fix one of the blade wheels or both of the blade wheels. A driving state is implemented by means of either a forward gear stage or a reverse gear stage with the start-up retarder disengaged or bypassed, and a braking state is implemented in each case by means of a reverse gear stage of the transmission with the primary blade wheel fixed.

Start-up retarders in which a hydrodynamic retarder is combined with a planetary gear set are also already known. As a particularly convenient replacement for a start-up clutch, the start-up retarders permit a hydraulic start-up procedure to be implemented with an additional start-up gear ratio and in a retarder mode. In order to ensure effective operation of such a design, however, both directions of rotation of the blade wheels must be taken into consideration, since, in a start-up procedure using such a retarder, the relative speed of rotation between the rotor and the stator can be negative, given that the rotor rotates in reverse, whereas this relative speed of rotation is positive in the actual retarder mode.

In such a start-up retarder, the rotational speed differential between the rotor and the stator tends to move toward zero in a start-up procedure. At an operating point at which the start-up retarder has reached the so-called parabolic peak thereof, and when the retarder chamber is filled with fluid and the fluid density and, therefore, the pressure cannot be increased any further, the transferrable torque begins to decrease quadratically with the rotational speed differential. Since the fluid density, together with the rotational speed differential, is a determining factor for the transferrable torque, a suitably disposed friction-shift element is usually required, which is activated in the engagement direction in order to compensate for the torque reduction and to conclude the start-up procedure.

Such a start-up retarder, comprising a hydrodynamic retarder and a planetary gear set, is known from DE 198 17 865 A1. The hydrodynamic retarder comprises a rotatable rotor blade wheel and a fixed stator blade wheel. The planetary gear set comprises a ring gear, a sun gear, and a planet carrier having planetary gears. The rotor of the retarder is connected or connectable to the sun gear and, in the reverse direction, is connectable or connected to the planet carrier. The planet carrier is connected or connectable to an engine-side drive shaft or to a transmission-side output shaft of the planetary gear set. The ring gear is therefore connected either to the output shaft or to the drive shaft. The retarder is designed as a double-flow retarder. This comprises two flow circuits having two blade assemblies, which are oppositely slanted relative to the circumferential direction, thereby enabling the rotor to generate sufficient braking power in both possible directions of rotation thereof.

SUMMARY OF THE INVENTION

Proceeding therefrom, the problem addressed by the invention is that of creating a start-up and retarder element that permits wear-free start-up and wear-free braking with high effectiveness and a high level of comfort, yet which is structurally simple and cost-effective to assemble. A further problem addressed is that of providing a method for operating such a start-up and retarder element.

These problems are solved by the features of the advantageous embodiments and developments of the invention as described below.

The invention is based on the finding that, in the case of a start-up and retarder element comprising a planetary gear set and a hydrodynamic transfer element having two rotatable blade wheels, one of the blade wheels can be designed to be engageable so as to be fixedly braked, and the two blade wheels can be coupled to the planetary gear set such that the transfer element functions as a fluid coupling in a start-up procedure, in which the fixable blade wheel is effective in the released position, and functions as a retarder in a braking procedure, in which the fixable blade wheel is effective in the fixedly braked position.

At start-up, the required supporting torque is provided at the planetary gear set by the hydrodynamic transfer element. This does not function as a retarder having an invariably fixed stator, however, but rather as a fluid coupling having a variably fixable stator. The control of the start-up function and the retarder function can be substantially implemented by fixedly braking the fixable blade wheel in a timed manner in interaction with the filling of the working chamber of the hydrodynamic transfer element with fluid, wherein a component of the planetary gear set that is connected to the blade wheel and rotates in the reverse direction at start-up, opposite the direction of rotation of the drive, reaches a zero crossing of the speed of rotation thereof during vehicle start-up, and is then fixedly braked together with the blade wheel and is brought into a retarder operating position. This functionality does not require two retarder circuits or certain shifting positions of a downstream vehicle transmission.

The invention therefore relates to a start-up and retarder element, which is disposed in a drive train of a vehicle in the power flow between a drive motor and a vehicle transmission and comprises a hydrodynamic transfer element and a planetary gear set, wherein the hydrodynamic transfer element has at least one first functional wheel and one second functional wheel, which form a working chamber, which can be filled with fluid in a controllable manner, for setting a hydrodynamic transfer torque, and the planetary gear set comprises a ring gear, a sun gear, and a planet carrier supporting a plurality of planetary gears, which are enmeshed with the sun gear and the ring gear.

In order to solve the stated problem with respect to the device, the invention also provides that the first functional wheel is rotatably disposed and is drivingly connected to one of the two planetary gear set elements, either the ring gear or the sun gear, that the first functional wheel can be fixed on a stationary component by means of a single shift element, that the other of the two planetary gear set elements, either the ring gear or the sun gear, is drivingly connected to a drive shaft of the drive motor, that the second functional wheel is rotatably disposed and is connected to the planet carrier, and that the planet carrier is connected or connectable to a transmission input shaft of the vehicle transmission such that a start-up function or a driving function can be set, in which the functional wheels of the hydrodynamic transfer element function as an impeller or a turbine of a hydrodynamic start-up element, and that a retarder function can be set, in which the functional wheels of the hydrodynamic transfer element function as a rotor or a stator of a hydrodynamic retarder.

By means of the design that is described, it is possible to utilize a single single-circuit flow machine to implement wear-free start-up and wear-free braking, for use in a drive train of a city bus, for example.

In order to solve the stated problem with respect to the method, the invention provides that a hydrodynamic transfer torque is built up in order to implement a start-up procedure by filling the working chamber of the transfer element, wherein one of the two planetary gear set elements, either the ring gear or the sun gear, is driven, as the drive element of the planetary gear set, by the drive motor, wherein the other of the two planetary gear set elements, either the ring gear or the sun gear, that is connected to the first functional wheel and can be fixed on a stationary component by means of a shift element, is fixed via the engagement of the shift element when the speed of rotation of the planetary gear set element crosses zero, and wherein the planet carrier, which is connected to the second functional wheel in a rotationally fixed manner, functions as a driven element of the planetary gear set and drives a transmission input shaft.

In this method, the supporting torque at the planetary gear set that is required in a start-up procedure is provided by the hydrodynamic transfer element, wherein the hydrodynamic transfer element does not function as a retarder, but rather as a fluid coupling.

In one embodiment of the start-up and retarder element according to the invention, the first functional wheel of the hydrodynamic transfer element can be drivingly connected to the sun gear, the second functional wheel can be drivingly connected to the planet carrier, and the ring gear can be drivingly connected to the drive shaft of the drive motor.

The method can be implemented with this start-up and retarder element as follows:

At the beginning of a start-up procedure, when the drive motor drives the ring gear with a positive speed of rotation, and the vehicle, and therefore the input shaft of the vehicle transmission, and the planet carrier with the second functional wheel, are at a standstill, the sun gear rotates in the reverse direction with the first functional wheel because the hydrodynamics are still inactive and the output drive is at a standstill. If the hydrodynamic transfer element or the fluid coupling is then filled, a transfer torque builds up and is present at the transmission input shaft or at the transmission input of the vehicle transmission as a positive torque and is supported against the planetary gear set. This prompts the start-up of the vehicle with a start-up gear that was previously engaged in the vehicle transmission. The speed of rotation of the output-side, second functional wheel begins to increase and the speed of rotation of the drive-side, first functional wheel begins to decrease.

In contrast to the behavior of conventional start-up retarders, which enter the region of the aforementioned parabolic peak as the rotational speed differential decreases, with the result that the transferrable torque decreases quadratically, in the start-up and retarder element according to the invention, the rotational speed differential between the functional wheels or between the planet carrier and the sun gear remains unchanged, even though the sun gear approaches a zero crossing (speed of rotation=zero) of the speed of rotation thereof, since the speed of rotation of the planet carrier increases in a corresponding manner.

When the sun gear reaches the zero crossing or a rotational-speed window at a speed of rotation close to zero, the shift element can be engaged without load, whereby the sun gear, with the associated first functional wheel, is fixedly braked on a rotationally fixed component. The hydrodynamic transfer element has thereby been switched from a fluid-coupling setting into a retarder setting and the actual start-up procedure is concluded.

Since the shift element can be engaged without load at the zero crossing, a simple and cost-effective shift dog is suitable therefor, although it is also possible to use a synchronizer clutch or a friction-locking brake.

In addition, after the shift element is engaged, the hydrodynamic transfer torque can be reduced by at least partially draining the working chamber, and a drive torque of the drive motor can be correspondingly reduced.

Once the shift element has been engaged, the transfer torque is supported against the fixedly braked sun gear. The fluid coupling can then be drained or partially drained. The transfer torque set at the hydrodynamic transfer element is thereby reduced, which induces a change in the transmission ratio of the transferred torque. The stepless transmission ratio at the hydrodynamic transfer element is increasingly superimposed by the planetary gear set, whereby the planetary gear set ultimately functions as a fixed transmission ratio between the drive motor and the vehicle transmission. In order to maintain or obtain a desired torque characteristic at the transmission input of the vehicle transmission, it is therefore expedient to adapt the drive torque of the drive motor, i.e., to reduce this accordingly, simultaneously with the decrease in torque at the fluid coupling.

Fixing the sun gear shortens the engaged gears in accordance with the transmission ratio of the planetary gear set. This can be used to advantage in a drive train with a hybrid drive, for example, in order to reduce the torque demand at an electric drive motor during electric driving or start-up.

When the shift element is engaged and the transfer element is drained or partially drained, the vehicle is in a normal driving mode. The hydrodynamic transfer element is switched to a retarder setting and is deactivated. The retarder function can be easily activated from this setting, in a braking procedure with the first functional wheel fixed, by building up a hydrodynamic transfer torque, which is effective as braking torque in the drive train, by at least partially filling the working chamber of the hydrodynamic transfer element. A wear-free additional brake is made available as a result.

In addition, in a stopping procedure, a hydrodynamic transfer torque can be built up and a drive torque of the drive motor can be correspondingly increased by at least partially filling the working chamber of the hydrodynamic transfer element, and the shift element can be disengaged.

As a result, when the vehicle stops, a drive motor, embodied as an internal combustion engine, can be reliably prevented from slowing to a speed that is markedly lower than an idle speed and stalling. A transfer torque is therefore built up at the fluid coupling or the hydrodynamic transfer element and a corresponding drive torque is simultaneously set at the internal combustion engine, thereby resulting in a desired input torque at the transmission input. As soon as the hydrodynamic transfer element transfers all the drive torque of the drive motor, the shift element can be disengaged without load and the sun gear can be released, whereupon the sun gear begins to rotate in reverse as the vehicle slows. The internal combustion engine can therefore maintain a constant speed of rotation and a minimum engine speed is therefore ensured when the vehicle is stopped.

The method described with reference to this first specified embodiment of the start-up and retarder element can be similarly implemented in an alternative embodiment of the invention in which the first functional wheel can be connected to the ring gear, the second functional wheel can be connected to the planet carrier, and the sun gear can be connected to the drive shaft of the drive motor.

When the start-up and retarder element is operated as a simple fluid coupling for start-up, there is no torque multiplication of the engine torque at the transmission input, which can take place with known hydrodynamic torque converters, for example, according to the so-called Trilok design, in which a working medium centripetally flows through a turbine.

In order to obtain a desired torque multiplication of the drive, the hydrodynamic transfer element can therefore comprise a third functional wheel, which is disposed between the first functional wheel and the second functional wheel such that a hydrodynamic torque converter in which the functional wheels function as impeller, turbine and stator is simulated when the start-up or driving function is implemented.

The fixed stator directs the fluid back into the first functional wheel, which then functions as an impeller, thereby increasing the torque of the sun gear connected to the first functional wheel. This torque multiplication acts on the torque of the planet carrier by means of the second functional wheel, which then functions as a turbine. The torque that results from the torque of the sun gear and the torque of the ring gear driven by the drive motor, and is transferred by the planet carrier to the transmission input shaft, is therefore multiplied relative to the engine torque by a conversion factor.

The start-up and retarder element according to the invention can be implemented in various drive trains that are driven by an internal combustion engine or have a hybrid drive and can be combined with various vehicle transmissions, such as automatic power-shift transmissions, automated manual transmissions, or group transmissions.

In order to utilize the fixed transmission ratio of the planetary gear set resulting from the engagement of the shift element and the reduction in torque at the fluid coupling as an input group of a vehicle transmission, the planet carrier can be shiftably connected to the transmission input shaft by means of a first clutch, and the planetary gear set element connected to the drive shaft of the drive motor can be shiftably connected to the transmission input shaft by means of a second clutch.

The first clutch can be used to engage the fixed transmission ratio of the planetary gear set as a first input transmission ratio and the second clutch can be used to engage a direct transmission ratio as a second input transmission ratio to the vehicle transmission.

The first clutch can be embodied, for example, as a claw clutch and the second clutch can be embodied as a friction clutch, As a result, power shifts between the two clutches can be implemented in a traction mode of the vehicle.

Basically it is therefore also possible to simulate the function of a hydrodynamic shifting clutch or a converter and clutch unit, i.e., a hydrodynamic transfer element comprising a lock-up clutch and an additional separating clutch for an automatic vehicle transmission that shifts with interruption of tractive force.

When the direct-transmission ratio clutch is disengaged, a comfortable, wear-free start-up with the hydrodynamic clutch can be implemented by means of the first clutch. In order to shift the gears, both clutches can be disengaged in order to decouple the drive motor. Such a converter and clutch unit or start-up and retarder element according to the invention, which performs such a function, can be provided for a heavy commercial vehicle, for example, in the case of which a wear-free start-up should be possible even under difficult conditions.

In a further embodiment of the invention, the planetary gear set element (the ring gear or the sun gear) that is connected to the drive shaft of the drive motor, and the planet carrier, can be coupled to one another by means of a clutch. This coupling can also be used to selectively engage a direct transmission ratio between the drive motor and the vehicle transmission. The first functional wheel of the hydrodynamic transfer element is thereby released, the shift element is therefore disengaged, and the retarder function is deactivated.

BRIEF DESCRIPTION OF THE DRAWINGS

Drawings accompany the description to further illustrate the invention. In the drawings.

DETAILED DESCRIPTION OF THE PREFERRED EMBODIMENTS

Figure 1:
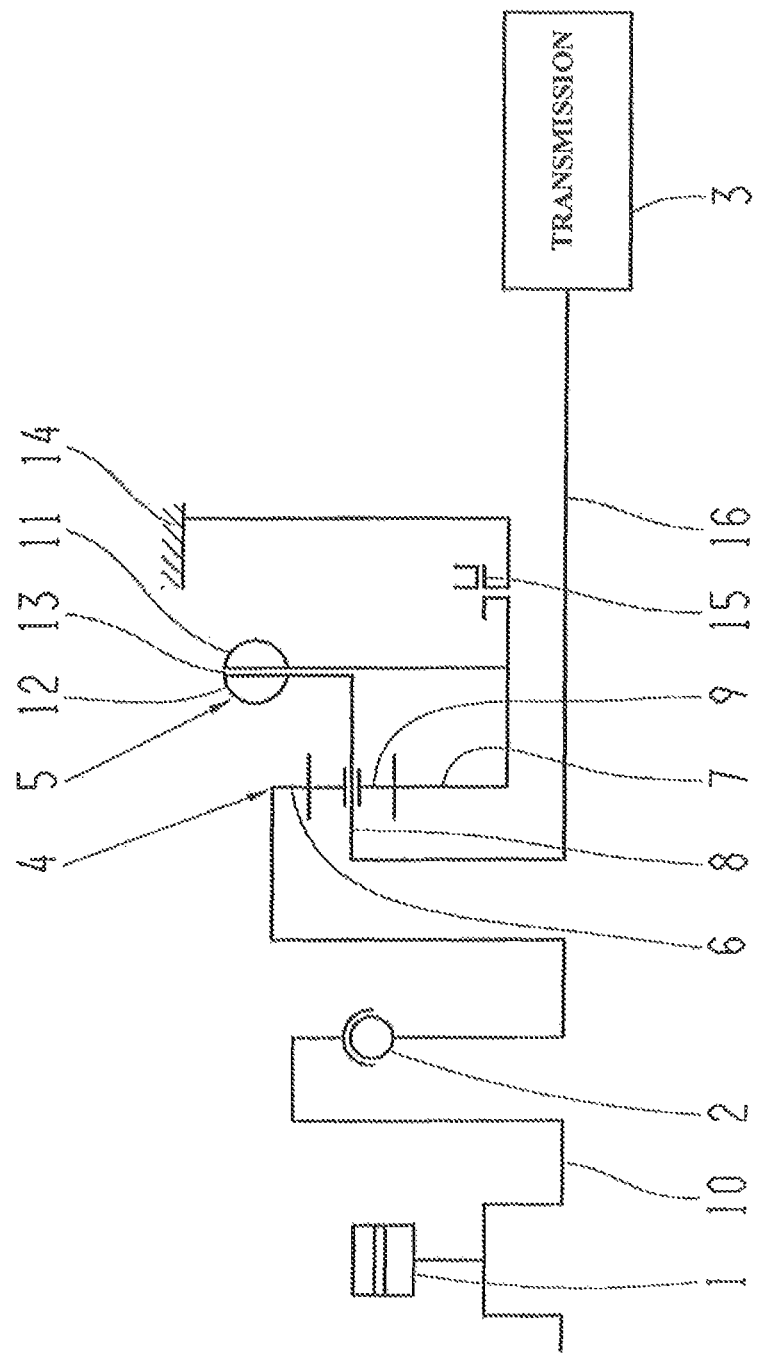
FIG. 1 shows a schematically simplified representation of a start-up and retarder element according to the invention.

As shown in FIG. 1, a start-up and retarder element is disposed in a drive train of a vehicle between a drive motor 1, which is embodied as an internal combustion engine, and a vehicle transmission 3. The start-up and retarder element comprises a planetary gear set 4 and a hydrodynamic transfer element 5. The planetary gear set 4 comprises an external ring gear 6, a central sun gear 7, and a planet carrier 8, which supports a plurality of planetary gears 9 enmeshed with the ring gear 6 and the sun gear 7.

The hydrodynamic transfer element 5 comprises a first functional wheel 11 and a second functional wheel 12. The two functional wheels 11, 12 are embodied as blade wheels, which are axially opposite one another and are disposed so as to be rotatable. These form a non-explicitly depicted working chamber 13, which is usually toroidal and can be filled with a fluid, for example, oil, by means of a non-illustrated hydraulic circuit. The hydraulic circuit can regulate the manner in which the working chamber 13 is acted upon with fluid and is relieved of fluid. A shift element 15 is disposed between the first functional wheel 11 and a rotationally fixed component 14, for example, a housing. The shift element 15 is embodied as a shift dog in this case.

The ring gear 6 of the planetary gear set 4 is connected to a drive shaft 10 of the internal combustion engine 1 by means of a torsional vibration damper 2. The sun gear 7 is drivingly connected to the first functional wheel 11 and, together with the first functional wheel 11, can be fixedly braked, or fixed on the housing 14 by means of the shift element 15. The planet carrier 8 is drivingly connected to a transmission input shaft 16 of the vehicle transmission 3 and to the second functional wheel 12. The hydrodynamic transfer element 5 is therefore disposed between the sun gear 7 and the planet carrier 8.

Figure 2:
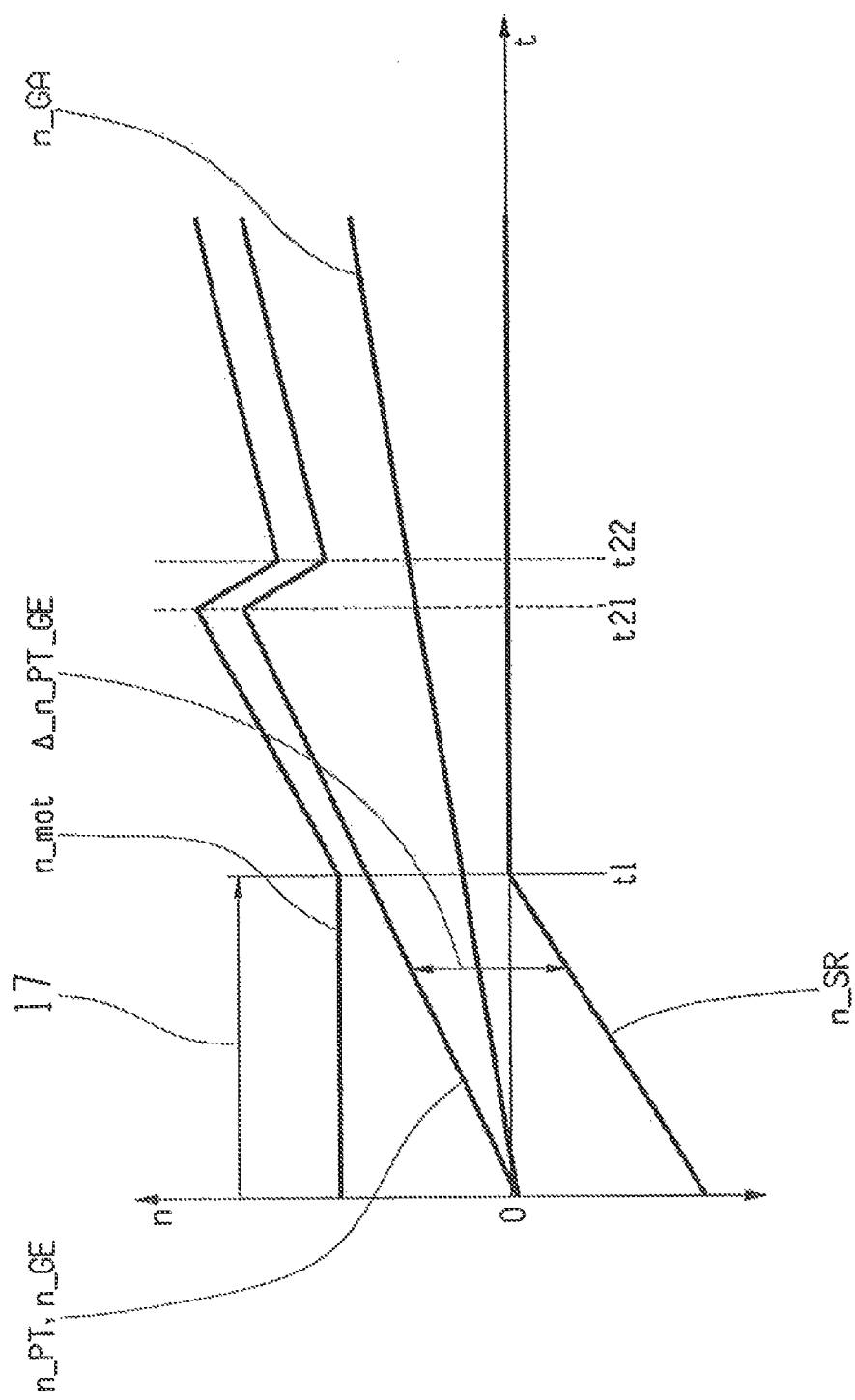
FIG. 2 shows a rotational speed diagram for implementing a method for operating the start-up and retarder element according to FIG. 1.

FIG. 2 illustrates a method for operating the start-up and retarder element with reference to a rotational speed characteristic of a start-up procedure having the start-up range 17 indicated in the diagram.

According thereto, at the beginning of the start-up in a start-up gear engaged in the vehicle transmission 3, the ring gear 6 of the planetary gear set 4 is driven by the internal combustion engine 1 by means of the drive shaft 10 at a constant positive engine speed n_mot, i.e., at a constant speed of rotation. The hydrodynamic transfer element 5 (fluid coupling or retarder) is then filled with the aforementioned fluid. The sun gear 7, with the first functional wheel 11, rotates in reverse, i.e., at a negative speed of rotation n_SR<0, wherein this speed of rotation constantly approaches a zero crossing n=0 as the hydrodynamic transfer torque builds up. Simultaneously, the speed of rotation n_PT of the planet carrier 8 and, therefore, the speed of rotation n_GE of the transmission input shaft 16, constantly increase with the torque acting via the second functional wheel 12. The rotational speed differential Δn_PT_SR between the planet carrier 8 and the sun gear 7 remains approximately constant. The vehicle begins to move with an increasing driving speed in accordance with a constantly increasing output rotational speed n_GA of the vehicle transmission 3, which acts on the driving vehicle wheels. The hydrodynamic transfer element 5 is in a fluid coupling setting, wherein the first functional wheel 11 functions as a pump and the second functional wheel 12 functions as a turbine.

The zero crossing n_SR=0 of the speed of rotation n_SR of the sun gear 7 is reached at a time t1. The shift dog 15 is then engaged without load and the sun gear 7, together with the first functional gear 11, is fixed on the housing and therefore does not have a speed of rotation as the course continues. The hydrodynamic transfer element 5 is then switched into a retarder setting, wherein the first functional wheel 11 corresponds to a stator and the second functional wheel 12 corresponds to a rotor of a retarder.

Once the shift dog 15 is engaged, the hydrodynamic transfer torque is reduced by draining the working chamber 13, and so the transfer element 5 is in the retarder setting but is deactivated. The planetary gear set 4 then functions as a fixed transmission ratio to the transmission input shaft 16.

While the torque at the fluid coupling 5 diminishes, the torque of the internal combustion engine 1 is simultaneously adapted thereto or reduced, thereby resulting in a constantly and continuously increasing rotational speed characteristic n_GE at the transmission input 16 when the drive via the fluid coupling transitions to the drive via the planetary gear set.

The engine speed n_mot constantly increases starting at time t1 according to the driver's wish or an actuation of the gas pedal by the driver, and the driving speed increases. A gear shift is initiated in the transmission 3 at a time $t_{-21}$, which follows the conclusion of the start-up procedure (start-up region 17). The speeds of rotation of the internal combustion engine n_mot and of the transmission input n_GE briefly decrease accordingly to permit synchronization of the new gear. These increase once more at a constant rate upon conclusion of the gear shift at the time t_22.

Figure 3:
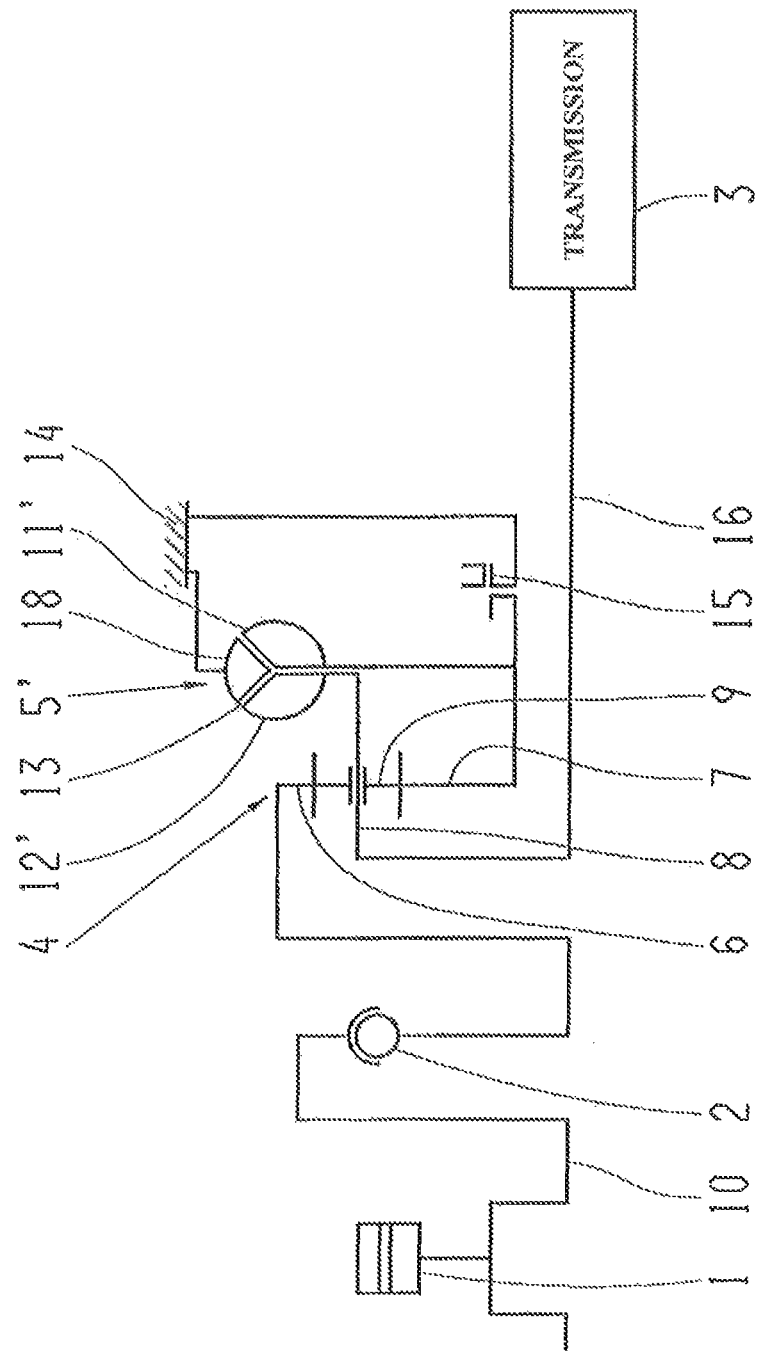
FIG. 3 shows a second embodiment of a start-up and retarder element according to the invention.

FIG. 3 shows one embodiment of a start-up and retarder element, in which a hydrodynamic transfer element 5' is embodied as a hydrodynamic torque converter. This comprises a first functional wheel 11' or impeller, and a second functional wheel 12' or turbine, as well as a fixed, third functional wheel 18 or stator.

In the start-up and retarder element according to FIG. 3, the torque equilibrium of the system is set by means of the fluid coupling, which is connected on the input side to the sun gear 7 and on the output side to the planet carrier 8. The torque of the sun gear 7 can be increased by means of the stator 18, due to the support thereof on the housing 14 and the redirection of the fluid for re-entry into the impeller 11'. This results in an increase in the torque of the planet carrier 8, which is connected to the turbine 12'. The planet carrier torque, which is the sum of the ring gear torque and the sun gear torque, is thereby multiplied by the conversion factor at the torque converter. The method for operating the start-up and retarder element designed according to the invention in a start-up procedure can be implemented similarly to the method described with reference to FIG. 2.

Figure 4:
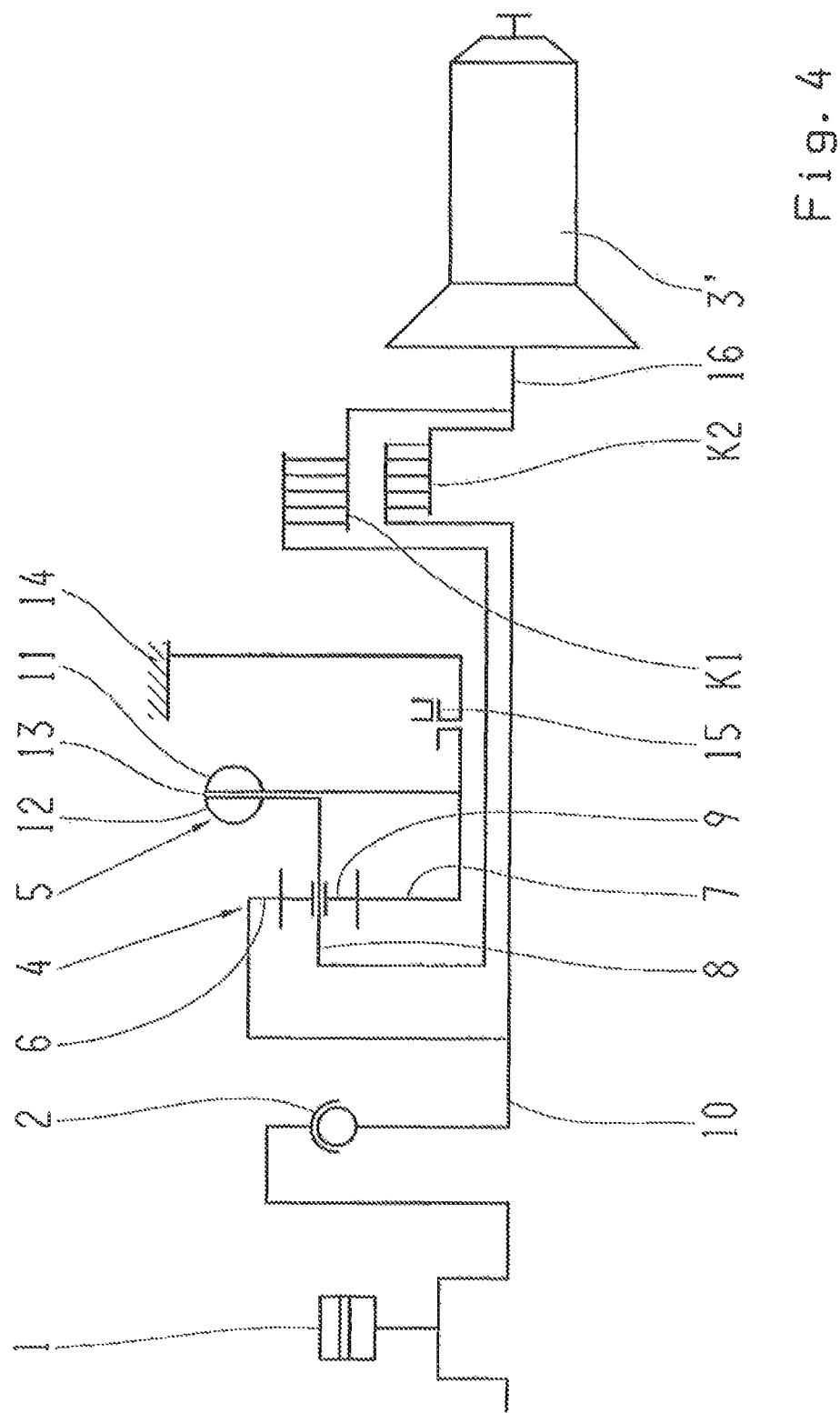
FIG. 4 shows the start-up and retarder element according to FIG. 1, in which a transmission is connected by means of two clutches.

FIG. 4 shows a connection of the start-up and retarder element according to FIG. 1 to a vehicle transmission 3 by means of two clutches K1 and K2, which are close to the transmission. Accordingly, the planet carrier 8 can be connected by means of a first clutch K1, and the ring gear 6 can be connected by means of a second clutch K2, to the transmission input shaft 16 in a force-locking manner. When the first clutch K1 is engaged, the transmission ratio of the planetary gear set 4 or the start-up function is engaged. When the second clutch K2 is engaged, a direct connection is established between the drive shaft 10 and the input shaft 16, i.e., a direct gear to the transmission 3' is established. One of the two clutches K1, K2 can be selectively engaged in order to implement a braking operation with a retarder when the transfer element 5 is filled. Different rotational speed ratios result at the retarder 5 depending on which clutch K1, K2 is engaged and, therefore, which connection is established, either to the planet carrier 8 or to the ring gear 6.

Figure 5:
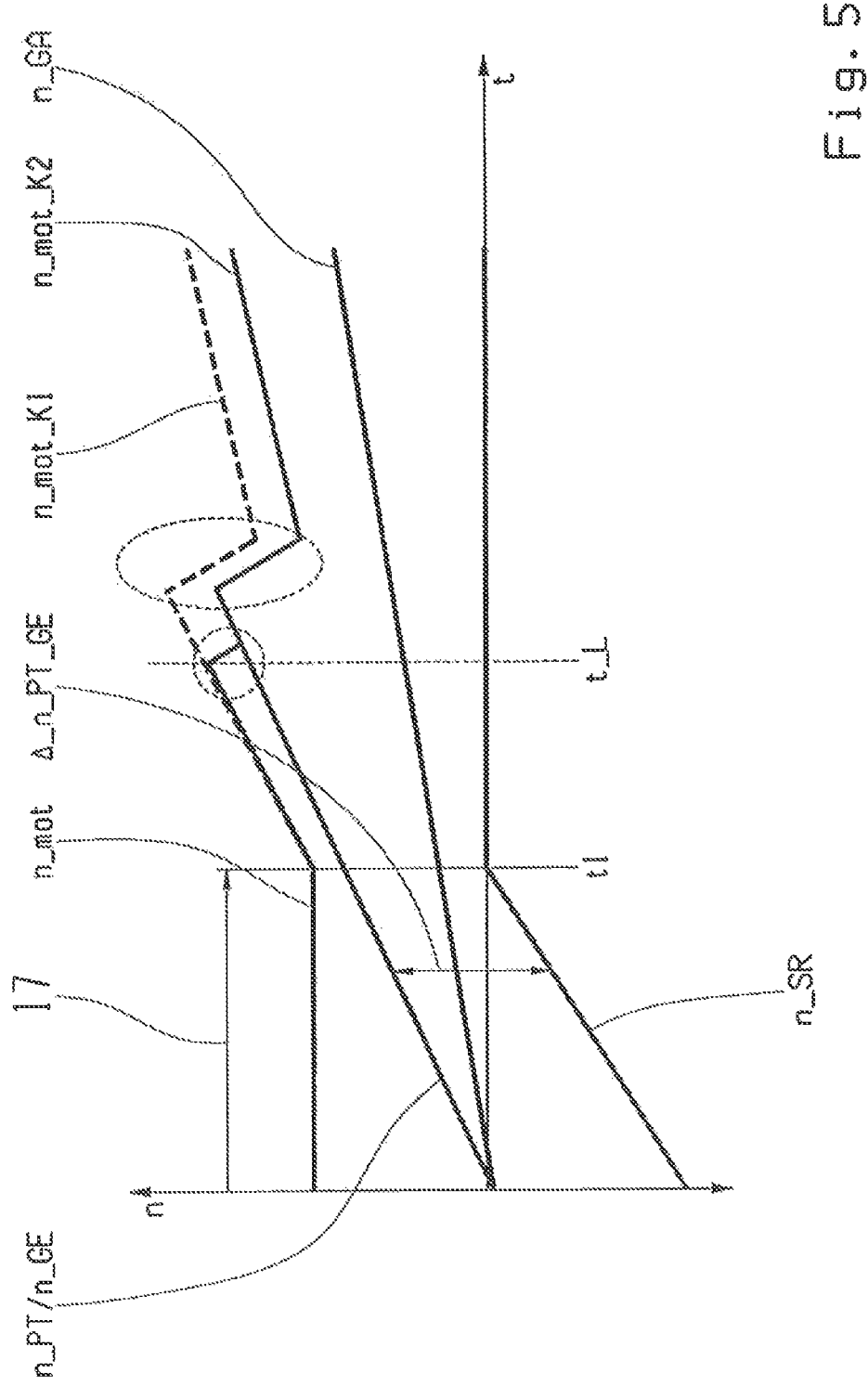
FIG. 5 shows a rotational speed diagram for implementing a method for operating the start-up and retarder element according to FIG. 4.

FIG. 5 shows a rotational speed characteristic for a start-up procedure using the start-up and retarder element according to FIG. 4 and shows a subsequent power shift between the two clutches K1, K2. For the example depicted in FIG. 5, it is assumed that the first clutch K1 is embodied as a claw clutch and the second clutch K2 is embodied as a friction clutch. It is therefore possible to implement power shifts between the two clutches K1, K2 in the traction mode without interruption of tractive force.

The actual start-up procedure takes place as described with reference to FIG. 2. After start-up with the first clutch K1 engaged and the second clutch K2 disengaged, the second clutch K2 is activated in the engagement direction in order to implement an upshift under load at a time t_L, and therefore the second clutch assumes the load and, therefore, the first clutch K1 can be disengaged without load at an overlapping time. Next, the second clutch K2 is synchronized under load with the speed of rotation of the transmission input shaft 16 and, once the speeds of rotation are equal, the second clutch is fully engaged. The rotational speed characteristic of the engine speed n_mot_K1 with the first clutch K1 engaged, which is higher than the transmission input speed n_GE, therefore changes into engine speed characteristic n_mot_K2 with the clutch K2 engaged, i.e., with a direct shift, wherein the engine speed characteristic n_mot_K2 corresponds to the transmission input speed n_GE.

In a downshift between the two clutches K1, K2 under load, the second clutch K2 is initially activated in slip, then the first clutch K1 is synchronized while the second clutch K2 still carries the entire load, and then the first clutch K1 is engaged without load. The first clutch K1 then assumes the load and the second clutch K2 can be disengaged without load.

Figure 6:
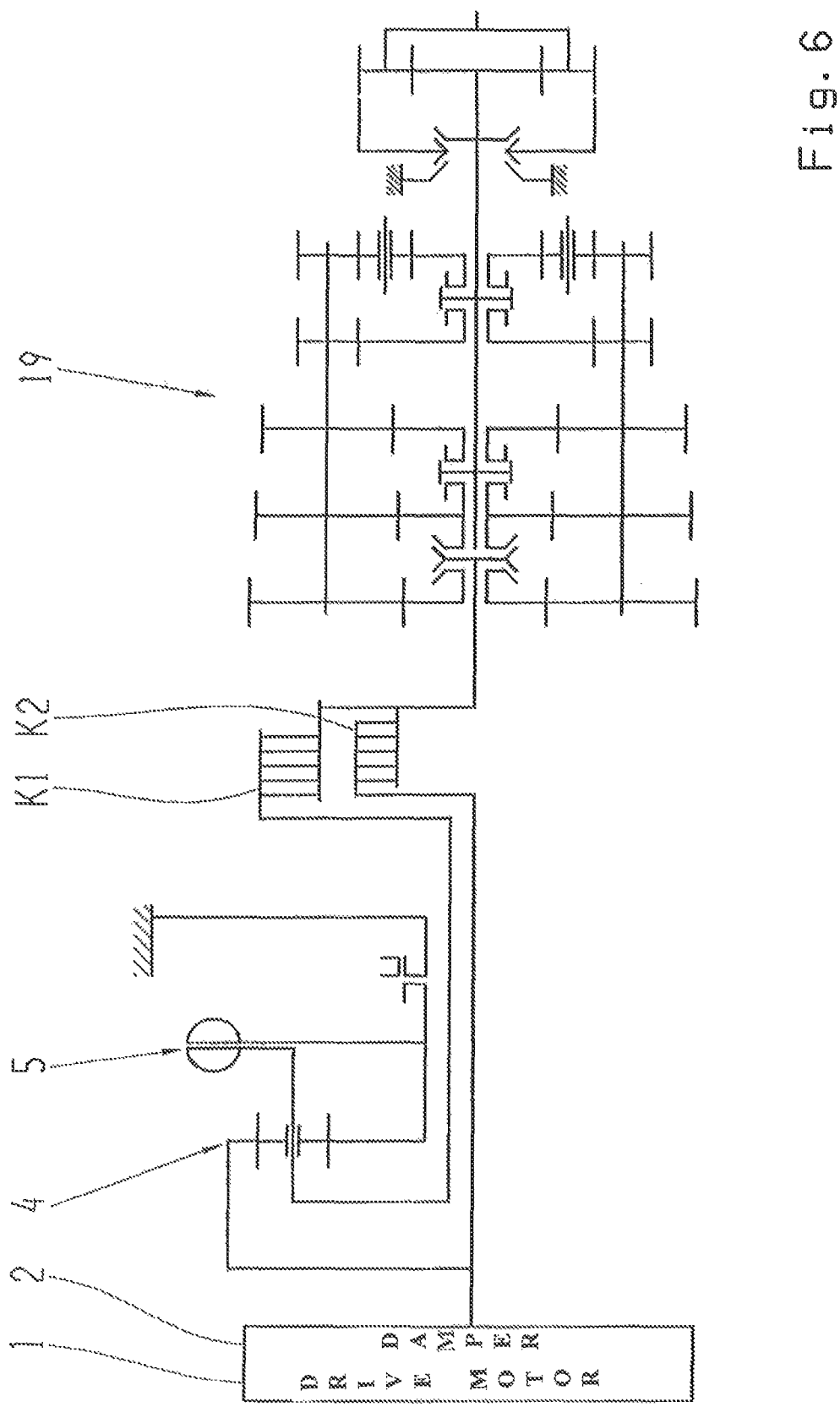
FIG. 6 shows the start-up and retarder element according to FIG. 4 in combination with a group transmission having a countershaft design.
Figure 7:
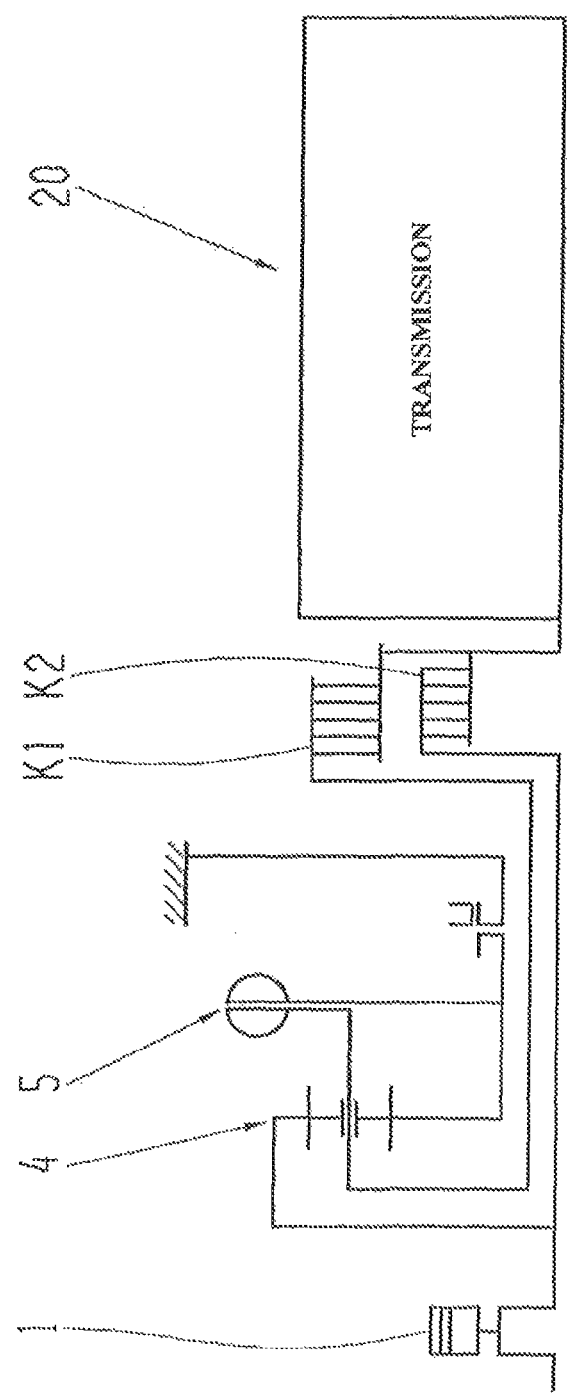
FIG. 7 shows the start-up and retarder element according to FIG. 4 in combination with a group transmission in planetary design.
Figure 8:
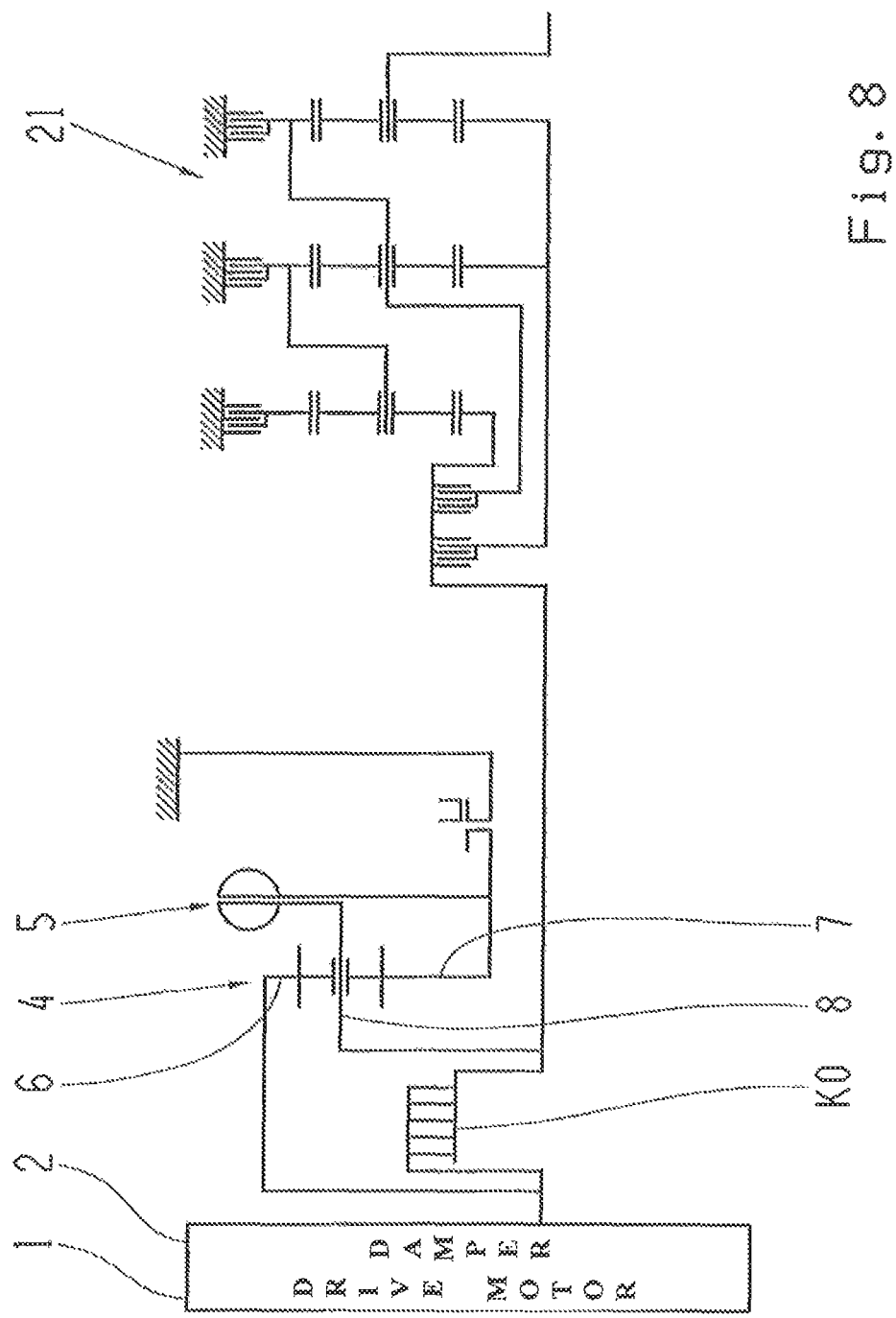
FIG. 8 shows a further embodiment of a start-up and retarder element according to the invention, in combination with a power-shift transmission in planetary design.

FIGS. 6 to 8 show the start-up and retarder element according to the invention in combination with various vehicle transmissions. These transmissions are known per se, in particular from the applicant's series. A more detailed description is therefore omitted here.

FIG. 6 shows the start-up and retarder element comprising the first and second clutches K1, K2 according to FIG. 4 in combination with a group transmission 19 from the applicant's AS-Tronic series, which has a two-speed splitter group in countershaft design, a three-speed main group in countershaft design, two axially parallel countershafts, and a coaxial input drive and output drive. In this transmission 19, a third gear is used together with a second input constant of the splitter group, a reverse gear plane is provided, and a downstream, two-speed range group is present in planetary design. The drive motor 1 and a torsional vibration damper 10 are shown as a block, for simplicity.

In this arrangement, a start-up procedure can be implemented in a first gear, which is shortened by the planetary gear set transmission ratio, by means of the first clutch K1, wherein the sun gear 7 is fixedly braked and the fluid coupling 5 is deactivated, i.e., is torque-free. The second clutch K2 is disengaged. A relatively low creep speed can be implemented as a result. A higher gear can be selected as the start-up gear, however, depending on the load and the driving resistance.

When this group transmission 19 is embodied as an automated manual transmission, as usual, which shifts with interruption of tractive force, both clutches K1, K2 can basically also be embodied as simple shift dogs, since tractive force must be interrupted anyway in a gear shift in order to synchronize the connecting procedure.

FIG. 7 shows the start-up and retarder element according to the invention, also with two clutches K1, K2 according to the embodiment explained with reference to FIG. 4, although in this case in combination with a non-illustrated group transmission 20 in planetary design. The result thereof is an overall transmission in planetary design comprising an integrated start-up retarder.

The overall device comprises the planetary gear set 4 of the start-up and retarder element and the planetary transmission 20 having, for example, a main group with planetary gear sets and a range group.

The start-up and retarder element according to the invention can replace an upstream planetary gear set as the splitter group. A separate start-up element can be omitted. Due to the start-up and retarder element, the function of a primary retarder is also made available. When the transmission 20 is designed as a tractive-force interrupting transmission, the two clutches K1, K2 can be embodied as shift dogs, thereby making it possible, overall, to produce a group transmission in planetary design without friction clutches, thereby ensuring that related frictional losses do not occur during operation.

Lastly, FIG. 8 shows a start-up and retarder element according to the invention in combination with a power-shift transmission from the applicant's ECOLIFE series, The power-shift transmission 21 comprises three planetary gear sets having three shifting brakes and two shifting clutches. In the start-up and retarder element, an input-side clutch K0 is disposed between the ring gear 6 and the planet carrier 8, thereby enabling the ring gear 6 and the planet carrier 8 to be coupled to one another. The two clutches K1, K2 shown in FIGS. 4, 6, and 7 in front of the transmission are omitted. When the input-side clutch K0 is engaged, the planetary gear set 4 of the start-up and retarder element rotates as a block, thereby establishing a direct connection or a direct gear to the transmission 21. The sun gear 7 is released and can therefore rotate freely, and the retarder function of the start-up and retarder element is deactivated accordingly.

LIST OF REFERENCE CHARACTERS 1 drive motor
2 torsional vibration damper
3, 3' vehicle transmission
4 planetary gear set
5, 5' hydrodynamic transfer element
6 ring gear
7 sun gear
8 planet carrier
9 planetary gear
10 drive shaft
11, 11' first functional wheel
12, 12' second functional wheel
13 working chamber
14 rotationally fixed component, housing
15 shift element
16 transmission input shaft
17 start-up region in the rotational speed characteristic diagram
18 third functional wheel, stator
19 vehicle transmission, group transmission
20 vehicle transmission, group transmission in planetary design
21 vehicle transmission, power-shift transmission
K0 input-side clutch
K1 first clutch
K2 second clutch
n speed of rotation
n_GA output rotational speed
n_GE transmission input speed
n_mot engine speed
n_mot_K1 engine speed with first clutch K1 engaged
n_mot_K2 engine speed with second clutch K2 engaged
n_PT speed of rotation of the planet carrier
n_SR speed of rotation of the sun gear
t time
t_1 Time at which shift element 15 is engaged
t_21 Time at which gear is disengaged
t_22 Time at which gear is engaged
t_L Time at which K1-K2 power shift is implemented
Δn_PT_SR Rotational speed differential between planet carrier 8 and sun gear 7

The invention claimed is:

1. A start-up and retarder element disposed in a drive train of a vehicle along a power flow between a drive motor (1) and a vehicle transmission (3, 3', 19, 20, 21), and the start-up and retarder element comprising:
a hydrodynamic transfer element (5, 5') and a planetary gear set (4),
the hydrodynamic transfer element (5, 5') comprising at least a first functional wheel (11, 11') and a second functional wheel (12, 12') which together form a working chamber (13),
the working chamber (13) being fillable with fluid, in a controllable manner, in order to set a hydrodynamic transfer torque,
the planetary gear set (4) having a ring gear (6), a sun gear (7), and a planet carrier (8) supporting a plurality of planetary gears (9),
the first functional wheel (11, 11') being disposed so as to be rotatable and being directly drivingly connected to one of the ring gear (6) or the sun gear (7), and the first functional wheel (11, 11') being fixable to a stationary component (14) by only a single shift element (15),
the other of the sun gear (7) and the ring gear (6) being either directly drivingly connected to a drive shaft (10) of the drive motor (1) or directly drivingly connected to the drive shaft (10) of the drive motor (1) via a torsional vibration damper (2),
the second functional wheel (12, 12') being disposed so as to be rotatable and being connected to the planet carrier (8), and the planet carrier (8) being either connected or connectable to a transmission input shaft (16) of the vehicle transmission (3, 3', 19, 20, 21),
when the first and the second functional wheels (11, 11'; 12, 12') of the hydrodynamic transfer element (5, 5') respectively function as an impeller and a turbine, either a start-up function or a driving function can be set, and
when the first and the second functional wheels (11, 11'; 12, 12') of the hydrodynamic transfer element (5, 5') respectively function as a rotor and a stator, a retarder function of a hydrodynamic retarder can be set.

2. The start-up and retarder element according to claim 1, wherein the first functional wheel (11, 11') is directly drivingly connected to the sun gear (7), the second functional wheel (12, 12') is drivingly connected to the planet carrier (8), and the ring gear (6) is drivingly connected to the drive shaft (10) of the drive motor (1).

3. The start-up and retarder element according to claim 1, wherein the first functional wheel (11, 11') is directly connected to the ring gear (6), the second functional wheel (12, 12') is connected to the planet carrier (8), and the sun gear (7) is connected to the drive shaft (10) of the drive motor (1).

4. The start-up and retarder element according to claim 1, wherein the hydrodynamic transfer element (5') comprises a third functional wheel (18), which is disposed between the first functional wheel (11') and the second functional wheel (12') such that a hydrodynamic torque converter, in which the first, the second and the third functional wheels (11', 12', 18) function as the impeller, the turbine and a stator is simulated when the start-up or driving function is implemented.

5. The start-up and retarder element according to claim 1, wherein the planet carrier (8) is shiftably connectable to the transmission input shaft (16) by a first clutch (K1), and the sun gear (7) or the ring gear (6) that is connected to the drive shaft (10) of the drive motor (1) is shiftably connectable to the transmission input shaft (16) by a second clutch (K2).

6. The start-up and retarder element according to claim 1, wherein the sun gear (7) or the ring gear (6) that is connected to the drive shaft (10) of the drive motor (1) and the planet carrier (8) are couplable to one another by an input-side clutch (K0).

7. A method of operating a start-up and retarder element, disposed in a drive train of a vehicle along a power flow between a drive motor (1) and a vehicle transmission (3, 3', 19, 20, 21), the start-up and retarder element comprises a hydrodynamic transfer element (5, 5') and a planetary gear set (4), the hydrodynamic transfer element (5, 5') comprises at least a first functional wheel (11, 11') and a second functional wheel (12, 12') which together form a working chamber (13), the working chamber (13) is fillable with fluid, in a controllable manner, in order to set a hydrodynamic transfer torque, and the planetary gear set (4) has a ring gear (6), a sun gear (7), and a planet carrier (8) which supports a plurality of planetary gears (9), the first functional wheel (11, 11') is disposed so as to be rotatable and is directly drivingly connected to one of the ring gear (6) or the sun gear (7), the first functional wheel (11, 11') is fixable to a stationary component (14) by only a single shift element (15), the other of the sun gear (7) or the ring gear (6) is either directly drivingly connected to a drive shaft (10) of the drive motor (1), or directly drivingly connected to the drive shaft (10) of the drive motor (1) via torsional vibration damper(2),the second functional wheel (12, 12') is disposed so as to be rotatable and is connected to the planet carrier (8), and the planet carrier (8) is either connected or connectable to a transmission input shaft (16) of the vehicle transmission (3, 3', 19, 20, 21), when the first and the second functional wheels (11, 11'; 12, 12') of the hydrodynamic transfer element (5, 5') respectively function as an impeller and a turbine, either a start-up function or a driving function can be set, and when the first and the second functional wheels (11, 11'; 12, 12') of the hydrodynamic transfer element (5, 5') respectively function as a rotor and a stator, a retarder function of a hydrodynamic retarder can be set, the method comprising the steps of:

building up a hydrodynamic transfer torque in order to implement a start-up procedure by filling the working chamber (13) of the transfer element (5, 5');

driving one of the ring gear (6) or the sun gear (7), as the drive element of the planetary gear set (4), via the drive motor (1);

fixing the other of the sun gear (7) or the ring gear (6), that is connected to the first functional wheel (11, 11') and is fixable on the stationary component (14) by the shift element (15), via the engagement of the shift element (15) when a speed of rotation of the planetary gear set element crosses zero; and driving the transmission input shaft (16) with the planet carrier (8), which is connected to the second functional wheel (12, 12') in a rotationally fixed manner, and functions as the driven element of the planetary gear set (4).

8. The method according to claim 7, further comprising, after the shift element (15) is engaged, reducing the hydrodynamic transfer torque by at least partially draining the working chamber (13), and correspondingly reducing the drive torque of the drive motor (1).

9. The method according to claim 7, further comprising, during a braking procedure with a fixed first functional wheel (11, 11'), building up the hydrodynamic transfer torque, which is effective as braking torque, by at least partially filling the working chamber (13).

10. The method according to claim 7, further comprising, during a stopping procedure, building up the hydrodynamic transfer torque by at least partially filling the working chamber (13), correspondingly increasing a drive torque of the drive motor (1), and disengaging the shift element (15).

11. A start-up and retarder element, disposed in a drive train of a vehicle along a power flow between a drive motor and a vehicle transmission, the start-up and retarder element comprising:

a hydrodynamic transfer element having at least first and second functional wheels which together form a working chamber, the working chamber communicating with a hydraulic circuit which controllably fills the working chamber with fluid to set a hydrodynamic transfer torque between the first and the second functional wheels;

a planetary gear set comprising a ring gear, a sun gear, and a planet carrier which rotatably supports a plurality of planetary gears;

the first functional wheel being rotatable and drivingly connected to one of the ring gear and the sun gear, the first functional wheel being connectable, via a shift element, to a stationary component such that when the shift element is engaged, the first functional wheel is rotationally fixed to the stationary component;

the other one of the ring gear and the sun gear being drivingly connected to a drive shaft of the drive motor and shiftably connectable to the transmission input shaft by a second clutch;

the second functional wheel being rotatable and directly connected to the planet carrier, and the planet carrier being shiftably connectable, via a first clutch, to the input shaft of the vehicle transmission; and the first and the second functional wheels being controllable such that the hydrodynamic transfer element functions either as a hydrodynamic start-up element or a driving element, when the first and the second functional wheels function as an impeller and a turbine, and the hydrodynamic transfer element functions as a hydrodynamic retarder, when the first and the second functional wheels function as a rotor and a stator.

\* \* \* \* \*